Feb. 12, 1935.     H. J. STONE     1,990,573
TRANSPORTATION VEHICLE
Filed Dec. 5, 1930     3 Sheets-Sheet 1

Feb. 12, 1935.　　　　H. J. STONE　　　　1,990,573
TRANSPORTATION VEHICLE
Filed Dec. 5, 1930　　　3 Sheets-Sheet 2

Harold Joiner Stone
INVENTOR

Feb. 12, 1935.  H. J. STONE  1,990,573
TRANSPORTATION VEHICLE
Filed Dec. 5, 1930   3 Sheets-Sheet 3

INVENTOR
Harold Joiner Stone

Patented Feb. 12, 1935

1,990,573

UNITED STATES PATENT OFFICE 1,990,573

TRANSPORTATION VEHICLE

Harold J. Stone, Los Angeles, Calif.

Application December 5, 1930, Serial No. 500,316

22 Claims. (Cl. 244—14)

This invention relates to improvements in vehicles of transportation designed interchangeably for use on land, sea, and under water, as well as in the air. The main characteristic of this invention is to introduce novel capabilities of craft and vehicles of every description.

One of the objects of this invention is to provide vehicles so designed, shaped, constructed, arranged and functioning as to be capable of safe carriage of passengers and cargoes, over long distances, upon any surface or medium, under conditions of rapid transit, commendable stability, improved equilibrium and complete control.

Another object of this invention is to provide vehicles, especially of flying craft capable of attaining elevation, speed, and purchase on any element.

A further object of this invention is to provide a simple, efficient and inexpensive vehicle or craft, whether designed for land, air or water use, which will possess a maximum lifting and propulsive ability thru its equipment of rotating hull-shields, vanes or rotors, and which will also possess unusual gliding and descending ability by direct or reverse action or pitch of air screws.

A still further object of this invention is to provide vehicular craft which can, for flying purposes, be operated with or without wings so as to initiate a faster rate of climb to any altitude than is now possible with conventional aeroplanes, and which is capable of ascent or descent vertically from a small landing field or area.

Another object of the present invention is to provide vehicles the parts of which are organized so as to be adapted for use in connection with hollow spiral-drum, cigar-shaped rotors on air, land, or sea. This type of rotor combines lightness, stability and self-righting characteristics and comes provided with hollow, spiral concave-shaped buoyant pontoon tubes having winding auger-shaped flanges or fins for the purpose of overcoming efficiently the air or other fluid resistances.

A further object thereof is to employ lighter-than-air dirigible types of airships or the like craft, which may be preferably so constructed as to be suspended in the air part of the time whilst in flight. This craft is constructed so as to be interchangeably serviceable for use on roads, or on ocean-flying vessels, automobiles, ra'lroad trains, and as loaded trailers. Such air-worthy craft are made in any tandem, or multiple formation and will, or may be, make-and-break-jointed for executing squadron flotilla, serpentine and other varied movements.

A still further purpose of this invention is to provide vehicular craft armed or equipped with rotor-drums which may also be rocket-auxiliary-acting as an aid to their boring action on the air circuit surrounding them, and as strong back-thrust jet propulsion greatly adding to the speed and power of the slipstream of the semi-automatic craft.

Another purpose thereof is to provide a vehicular craft of such a shape and design as to have an encased non-revolvable cabin and an axially disposed peripherally-arranged revolving rotor with convolute vanes, as auger screw-shaped concave-convex fins. This same type may take the form of a peripherally rotating serpentine rotor casting off an air-circuit from its whorls so as to create considerable accumulation of forward-acting pressure on the rear of the downward sloping top. The reaction of this form of rotating, annular-curved or spiral external cylinder is to create a suction on one side and a drive on the other side to thereby accelerate motion.

A further object of this invention is to provide universal joint-linking means of interconnecting buoyant, or non-buoyant rigid bodies associated with vehicular craft operating on, under water or on or above land. This has made it necessary to provide segmental forms of rotors for use thereon and cabins as well as side pontoons, and lateral rotors are provided to form trains in the air of inexhaustible energy and unfailing safety.

Another object of this invention is to provide vehicular craft of the types described, operating on land and in the water or air, designed to furnish gasoline or other fuel or energy or power impulses, or all of these to flying craft following or preceding the same in transportation motion, as by trolley and hollow shafting extending above from the supplying vehicle.

In carrying out the present invention use is made also of cabin-planed or true flying wing structures aided in flight and in stabilizing efficiency by the auger or screw-shaped pontoon rotor-stabilizers.

With the above and other objects in view my invention consists of the combination, arrangement and details of construction disclosed in the drawings and specifications, and then more particularly pointed out in the appended claims.

In the drawings wherein similar reference characters designate similar parts.

Referring to the drawings, which are merely illustrative of my invention I will first describe the characteristics underlying in common all the various forms of vehicular craft hereinafter described.

The salient feature of my present invention is to produce types of specially constructed, specially functioning craft which lend themselves particularly for use in connection with the type of rotor stabilizers set forth, or other suitable propulsive means. In said application, I make use of air-screw turbine motors having propulsive and stabilizing effects, providing a universal-joint action, used under conditions of equalization on land, air or water interchangeably if need be. The propeller-stabilizers are preferably of the upward-nosing and vari-angular screw-rotor type providing a powerful lifting and maneuvering factor and lightness in rapid motion. The propeller stabilizers having convolute fins of concave-convex formation will tend to strengthen the framework of the craft, also deriving spring-action from such a serpentine and resilient form.

The turbine, pontoon rotor units are further characterized by helical spiral-gyrating drums providing satisfactory gyroscopic and cantilever stabilizers for land, air or water craft as well as serving as propulsive mediums. The concave, flanged drums may be arranged in single series or unit at the bottom of a ship or car, or where there is more than one row on either side, the air, water or other fluid being sucked in with accelerated speed and forced strongly down and backward along the sides. This enables the attainment of much faster speeds thru the overcoming of friction, avoiding of slow stops and turns, and the minimizing of vibration.

These pontoon rotor stabilizers are made to travel faster due to their rotary, spiral-shelled drums, working more on the principle of a bullet, there being less friction or contact area with less beam breadth and greater length of extension. They are shaped to provide concave-convex convolutions, having segmental "lands" and sharp "valley" grooves, spirally covering the whole rotating shell for more strongly cutting the air. They also strengthen the ship against terrific shocks of wind attack.

It will be understood that conventional types of planes can be outfitted with these propulsive-stabilizing units but in most cases they will have to be changed slightly to be adapted for use in connection with them. The changes having been made the craft will be found to be stream-lined smoothly, with curved deep-spiralled valleys and separating stream-lined helical fins, passing in long, smooth-curved lines of extension from pole to pole around the body to meet the smooth periphal surface of segmented fuselages. To enable such craft to attain the fastest speeds the screw-pontoon bullet-shaped rotors eject forcibly and laterally of the cabins or fuselages as well as backward by means of long, spiral-shaped hulls of a specially constructed ship while forcibly sucking in and accelerating all the currents which ordinarily retard momentum so that all the head resistance will be overcome.

It will be here noted what are the essential conditions of successful motion thru use of the auger pontoon jet-propelled rotors hereinbefore set forth. They should be alternately spirally-rifled, and rigidly but also angle-disposedly or loosely jointed together to utilize the newly discovered force technically called by engineers the "Magnus Effect", which is explained as being the accumulation of air pressure along one side of any whirling body and the comparative absence or decreased pressure of air at the other side thereof, or upon the side on which the wind or current happens to be impinging. The rotor-stabilizers thus produce their own counterpoising stream of forward-propelling and strongly sailing efficient current, its bullet shape with spirally-rifled surface making it divert more of the current by increased friction to one side. From this side there is a pushing effect exerted always virtually at right angles to the wind, or artificial stream current.

I have discovered, in taking advantage of the "Magnus Effect" of propulsive bodies, that a definite pronounced lifting effect is promoted by suitable angular positioning of rotors and of corresponding fuselage or wings of the type hereinbefore set forth. I have therefore provided a special type and formation of wing surfaces, which, when made large will serve as landing fields, or air ports for other air craft; are more or less spatula or spoon-shaped; are capable of exhibiting in flight a hovering action; and finally to oscillate rotatably about the whirling hull-fuselage shown as possible in its rotary-functional shaft coupling for the associated rotary structure (10, Fig. 1) which may also be itself merely hollow or equipped for amphibian interior habitation. These wing and rotor forms may also contribute their habitable, coextensive parallel lifting, adjustability, inflatable-chambered, spiraled and other features to an ordinary transversely-placed airfoil at tangential or right angles to the line of travel or slipstream as in universally jointed propeller-stabilizer 10, of Figure 1. This produces an armored shield around the craft or vehicle. There are also devised rotatably oscillating wings, to cover the pontoon screw rotors and adjustable wings which include underslung groups, that may be placed in any multiple-decked linear or lateral train arrangement. Finally there are evolved glider spoon-shaped wings or roofs for flying craft with or without auxiliary rotors of the well known screw-design, since this form may be used solely as a glider.

Figure 1:
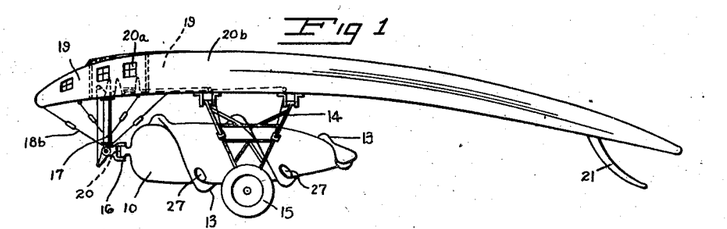
Figure 1 is a side elevation of a hollow-chambered structure which may or may not have propellers but is here motivated by pontoon rotor stabilizer, to be described.
Figure 2:
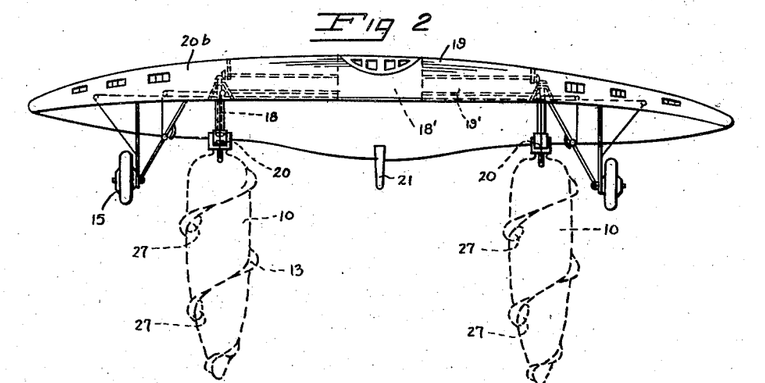
Figure 2 is a front elevation of Figure 1 which may have single or multiple stabilizers.
Figure 3:
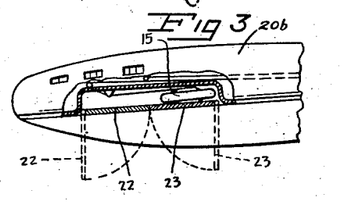
Figure 3 is a fragmental detail view of Figure 1 showing the pocket for retaining landing gear out of position, for streamlining.
Figure 13:
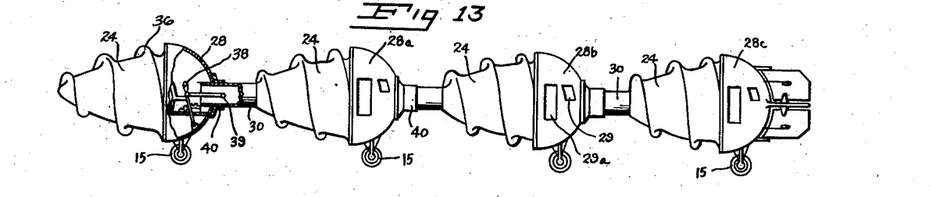
Figure 13 is a side elevation of a land, water and aerial train.

Reference now being made to Figures 1 and 2 a habitable, universally-jointed wing of elliptical spoonshape is shown with the novel single or multiple rotor means vari-angularly and adjustably placed in vortex relation beneath. When made large, this type of cabin-winged aircraft, as stated previously, may oscillate in relation to its underslung buoying dirigible means, while still maintaining an approximate even keel as its controlling turbine means beneath changes its angle of incidence, or travel. Quick looping-the-loop or side turns would not disturb interior passengers, etc., any more than in any diving aeroplane. Hence as mentioned this wing, as also those similar, as in Figs. 10, 11, and 13, may be equipped and serve as an aerial landing field and interiorally as an enclosed hangar and garage for its attendant. Here as in other figures 20 is used to indicate the large suction-intake opening for accelerated elimination of frontal air impact observed throughout this system. Here the wing 20b is formed longitudinally of concave-convex cross-section formed integrally thereon with the build-in cabin 19 having windows 20a. The landing rigging consists of two parts, the collapsible framework shown retracted in Figure 3 and the wheels 15. The wing-fuselage carries the usual tail skid 21 at its rear, as well as two trap doors or gates 22 and 23, hingedly mounted so when opened they will provide a suitable pocket in which may be reposed, when not in use, the landing gear as is shown clearly in Figure 3. From the engine room 18', lead suitable drive connections 19' to the shafts 18 of the pontoon, universal rotor or rotors 10, which is of the torpedo bullet-shaped type carrying the convolute fins 13, and providing a buoyant stabilizer if inflated and combining any or all of the features already described in conjunction with same, such as of jet propulsion and habitable rotor structure or wings, and universal joint connection with multiple or duplicate mutual association of parts. It is understood that the universally applicable actuation and directional energizing and control means of compressed air and electrical installation are applied here to the mechanism thru parts 16, 17, 18, etc.; to move and propel rotors 10, as is also done throughout the rotor connections of the vehicles in this invention, following the preferred means shown in original figures, of which Figure 11 and associate compound rotor-assembled figures form this case. For this the power cabin 58, or similar cabin retracted interior engine rooms may supply the electrical current and charges of compressed air or other fluid actuation and control as claimed for the various figures. This energy may be generated and supplied from any of my coordinated cabin or rotor bodies, especially where the design is an amphibian vehicle and the heavier Diesel engines, and various types of other power auxiliaries may be carried upon the suitably water-supported or powerful flying amphibian water extensions of my train-convoyed, multi-purpose designed vehicles, or within their rotors, as in Figures 1, 5, 6, 9, 10, 14, etc., thus giving my selective and collective actuation. By any desirable mechanism it is proposed to turn this pair of laterally arranged parallel turbine rotor-stabilizers in any desired angle necessary to arrange for and to effect the elevation, descension, or direction-changing required for safety in flight.

Figure 4:
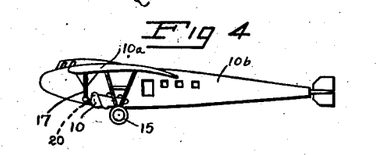
Figure 4 is a side elevation of standard heavier-than-air craft showing my invention applied thereto.
Figure 5:
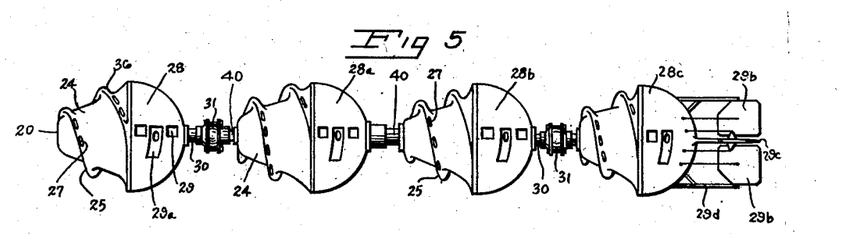
Figure 5 is a side elevation of a multiple-jointed train type of vehicular craft about to be described.

It will be understood that the units 10 continue to rotate as they are shifted in any adjusted and angular position. Being located at the front of the machine, one at each end, they serve adequately to equalize the movement of the machine and are coupled universally as at 16, being supported upon pendant stanchion 18 or the like. 18b designates the guy wires or turn-buckle struts for reinforcing the pendant stanchions in a manner well known to those skilled in the art. In Figure 4 similar types of rotor pontoon-stabilizer units are shown mounted upon a conventional heavier-than-air flying machine. Here the wing planes 10A are of standard formation as is the body or fuselage construction 10b. This flying wing may, if desired, be inflated, with retreated, disappearing wheel gear, engine room and cargo carried directly within the wing or wings and the spiral motors or rotors underslung.

The structure may also be multi-decked which will give it increased lifting and safety efficiency. The shape of the wings is also such as to give the rotor propellers a rigid control and hold upon the fluid medium, which is being rapidly wafted and expelled rearwardly by the spirals, tending to create a vacuum-like vortex and in turn an upward force acting against the concave under wing-surface. The rotor units can readily be all vertically positioned as is shown clearly in Figures 2 and 11, and by rotating the propellers furiously in reverse pitch just before landing an easy descent to the ground can be made. In such maneuvering the deck-roofs or wings may be turned vertically with the rotors not hindering, by cupping the air—mechanism not shown since the vertical function is seen to reside in the controlled maneuverings of the unitary-yoking universal connecting joint for connecting one or more pivotal rotors.

I will now describe the aerial train, or the train type of my invention which permits vehicular craft to be constructed of independently arranged units, universally jointed and linked together for conjoint, or for individual action. These craft are illustrated in Figures 5, 6, 7, 8, and 13 respectively. This type of craft permits of far greater speed being attained than would otherwise be possible, and besides friction is counteracted. A plurality of motion giving bodies have spiral convolutions such as the propulsion units 24. Preferably not less than four in number are here employed, the helical screw vanes of which are designated 25, 26 etc., while the jet openings 27 which follow the pitch of the vanes, allow for an additional rocket motive force for accelerating speed of the vehicle or craft. These propulsion units 24 may preferably taper to a nose towards their extreme forward ends, while their inner broader parts are operatively and rotatedly received in semi-circular cabins or fuselages 28, 28a, 28b, and 28c of the entire series of the cars of the train. 29a is a door and 29 is a window. The cabins 28 etc. are loosely, angularly or universally jointed to the next propulsive unit seriatim by effective universal couplings 31 to which the propulsive unit shafts 30 are interconnected. The last element of the train carries the rudder controls 29b, 29c mounted upon suitable operative struts 29d in any operative manner. Mechanism is thus provided for shifting the angular disposition of the buoyant rotor bodies 28, 28a, 28b, and 28c respectively for direction-changing or for maneuvering purposes.

These several propulsive stabilizing units are arranged in linear disposition, one in back of the other in one row or in multiple rows as will best subserve their attaining equilibrium as well as speed. The spiral jet convolutions of the rotors are arranged for vortex-creating purposes the cabins 28 of which are non-rotating, and have openings or windows 29 if necessary. It will be seen that should any unit of this aerial train become crippled or disabled in flight or during military operations the same could by desirable means be uncoupled without interfering with the functioning of the other units. For example by means of the lever 38 (which may be ratchet controlled) and which operates the pitman 39 it is possible to telescope the stems 40 of the units of propulsive means particularly illustrated in Figure 13, the movement of each unit causing that unit to the rear to follow suit. This type of craft is designed for land, water or air use conjointly, as any of the units can be shifted about readily in counterpoised relation for better stabilizing purposes, or for varying their linear continuity, Magnus Effect etc.

This segmental form of rotors and cabins, as well as buoyant pontoons makes it possible to form trains in the air, of inexhaustible energy and unfailing safety, which permits the entire multiple series of pontoons to be lengthened or shortened. A unitary mechanism is employed for simultaneously or for independently varying distance between the pontoons. These pontoon propellers, thus arranged in jointed relationship become virtually what I may term friction nullifiers. These several rotors should be rotated in a multiple train or other multiple formation as fast as the wind or slightly faster in order to produce a strong "Magnus Effect". A variation of alternate motors in proper zig-zag formation while flying will multiply or retard speed perceptibly and economically. Hence the type of craft just now described tends to provide a continuous, all-covering turbine-shaped spiral hull, retreating before the head winds of transit, turning but little faster than the wind would cause it to do and actuated by only a small necessary ratio of mechanical power.

Figure 6:
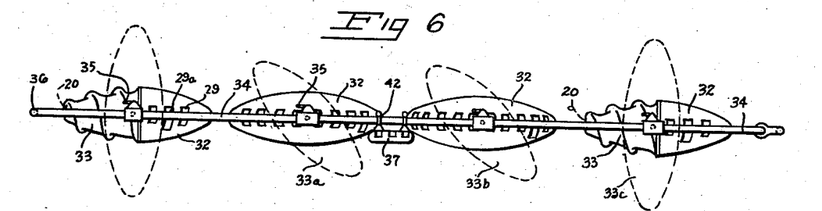
Figure 6 is another type of multiple-jointed craft.
Figure 7:
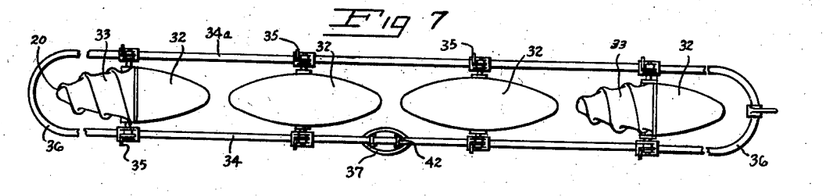
Figure 7 is a top plan view of Figure 6.
Figure 8:
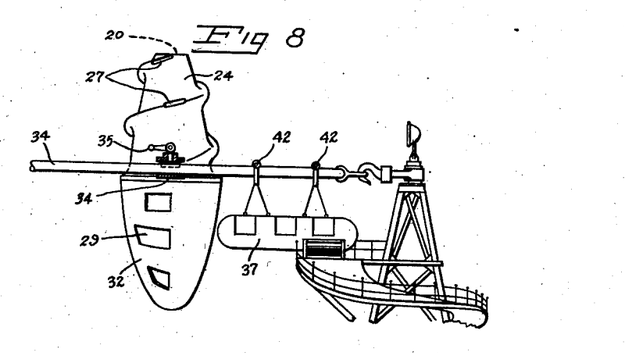
Figure 8 is a side view of a vertically-adjusted control of Figure 6.

It is vital to understand that unless more than three of the pontoon units 28 are interlinked together in series there may be a tendency to unbalance the craft, especially when the different units are being variously shifted or adjusted. In Figure 6 the angular adjustment of the individual pontoon rotors are indicated in dotted lines, and they may thus be placed in any position in a circle of 360 degrees. In Figures 6 and 7 it will be further noted that a frame is provided having parallel elongated hollow communicating shafts 34, 34a and end closed loops 36, which shafting may thus loop together in between various or successive craft units and be provided with the make and break universal joints seen in Fig. 5. Each terminal loop shows a break in continuity indicating any further desired extension of like, or analogous craft and shafting formation, such for instance as seen in Figs. 1, 4, 5, 9, 10, 11, 13 or of similar laterally controllable vehicles, other trains or units thus being possible in tangential or suspended relations from the joints of such trains as shown in figures herein, any two or more jointed units of rotor or wing formation being considered as a train-aggregate, each unit being tiltable with reference to its shafting frame, 34. Slidably engaging the said shafts 34, 34a there is a suitable lever 35 employed to tilt the units in any efficient selective angle, said lever joints also comprising make-and-break operative and various communicative jointing. To reach these units suspension cars 37 are employed which ply thru their pulleys 42 upon the shafts of the frame or equivalent circulating interior-tube transit means may be provided and if desired also elevators.

The rocket-jet ports 27 of these units are properly associated with the elliptical chambers of aircraft bodies for circuit-propulsion purposes and will have strong, armored construction similar to that of warships. These jets are, or may be, expelled from rocket-mechanism at the speed of one thousand miles or more, depending on the jet force. This should make possible speeds the equivalent of artillery projectiles, which also gives increased lifting power.

Figure 9:
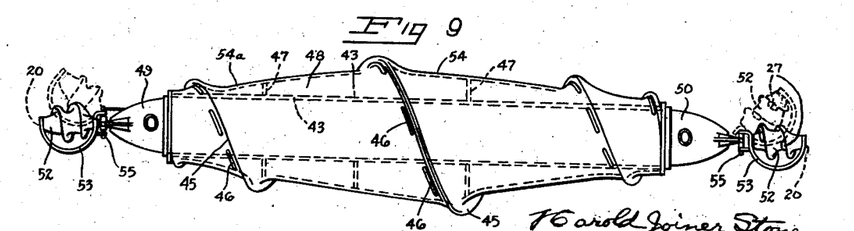
Figure 9 is a side elevation of a vehicular craft showing an encased non-rotating cabin with axial and angle-disposing propeller and rudder-stabilizers.

We now come to the encased cabin type of vehicular craft such as is illustrated particularly in Figure 9. Here is shown a continuous torsional shell 54 shaped like a spiral cigar from end to end, being a floating pontoon body of cylindrical shape provided with peripheral, helical or convolute corrugations or vane-fins 45 which may be jet aided and propelled thru the medium of the rocket-jet ports 46 associated with the valleys of the vanes or fins. Interiorly of this shell extend tangentially the separating partitions 47 which run in annular extension around the longitudinal, non-rotating chambered fuselage 43, being in the form of a coaxial cabin in which the machinery, crew, passengers and freight can or will be carried. Between the fuselage 43 and shell 54 are the inflatable bulkheads 48, corresponding, but there in a fixed relation, to bulkheads 56 in Figure 11. At the ends of the craft are bullet-shaped non-fin carrying conical non-rotating cabins 49, 50 for the pilots who operate the controls. The angularly adjustable elevating and descent controlling units 52 are arranged in universally swivel-holding, segmental frames 53, suitable mechanism 55 being employed to operate these controls which may optionally include electrical and other suitable steering, control and actuating means, as for instance extension and application of the rocket-aided comprised compressed air means, shown used on the central rotor shell 54; out thru rocket ports 46; and the universally applicable electrical provision of power, aiding the unlimited power supply desirable and claimed for these train-designed types of vehicles and craft. All hollow struts and communications may supply conduit means. The peripherally disposed rotating shell 54 may have transparent parts thru which observation may be had of external weather conditions, etc., or variant segmental lanes of vision may be provided. The constant revolution of the outer pontoon rotor shell, protecting as it does, the interior fuselage is particularly useful in military operations since bullets must first strike the outer shell before reaching the interior non-rotating fuselage and due to the centrifugal action of the outer rotating shell, the bullets would simply be ricocheted away from the craft and do no harm. These shell-drums are thus used unitedly as propellers, rotor-gyro-stabilizers and as rocket-jet skin-friction nullifiers over the whole or over a segment of the circular hull of a non-rotating car, fuselage, automobile or the like. This type of craft may also be constructed single-bodied or multiple-bodied and if made multiple-bodied may be oppositely counterpoised. The whirling hull envelops the non-rotating cabin and cargo interior compartment in such a manner that speed and safety are increased. Proper pressure and revolving speeds result in equilibrium at all points in the axial length of the composite device. The revolving speeds and directions of rotors may be reversibly controlled, not only by interior control gear and clutch mechanism, giving rotor breaking effect, but also by the reversible directional control of the rocket currents ejected out of the jet ports.

Figure 10:
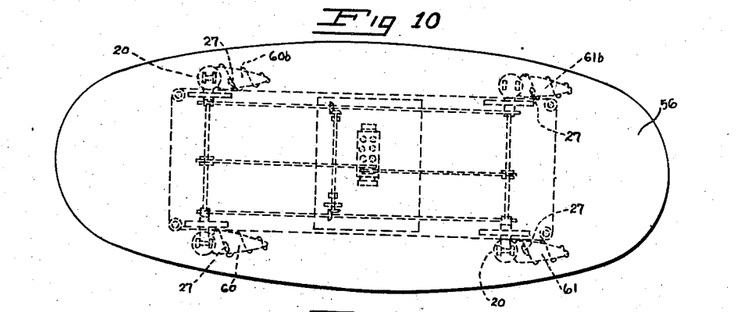
Figure 10 is a top plan view of the novel elongated heavier or lighter-than-air craft with bi-planes, equipped with my universal rotors, or of a multiple-motored monoplane.
Figure 11:
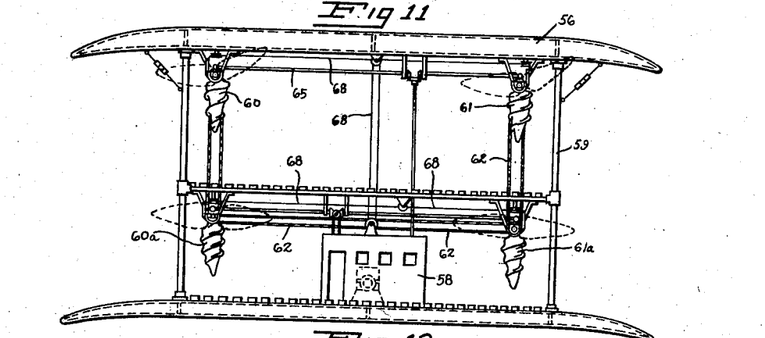
Figure 11 is a side elevation of Figure 10, a multi-planed dirigible-aeroplane here shown in biplane formation.
Figure 12:
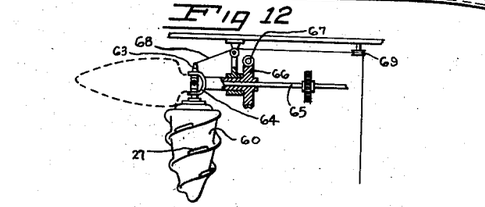
Figure 12 is a detail, fragmental sectional view of controls for the stabilizing propeller forming the rotor part of my invention.

In Figures 10, 11, and 12 respectively a still further type of craft is disclosed. Here a biplane type of flying craft is illustrated consisting of the hollow-chambered wings 56, 57, connected by the stanchions or struts 59 operatively, the planes being ovate and spoonshaped and of proper desired wing-spread. From the cabin 58 are driving connections for rotating the pontoon screw rotors shown here as two upper twin adjustable sets 60, 61 60b, and 61b and a lower twin, adjusting set 60a and 61a respectively with their associate rotors being behind, these upper and lower units being caused to operate or function conjointly and adjustably by means of the belts 62 and rotor-stabilizer controls 68. When it is desired to effect the lifting of the plane structures, it will be necessary to drive the pontoon screws into vertical position as shown in Figure 11, and then when they have been placed in horizontal position again the air craft will be propelled forwardly. Hence there is provided a propulsive stabilizing unit of which one part has a wing-spread and another part is composed of one or more spiral rotary convolute-vaned rotors.

In Figure 12, a means of rotating and at the same time, shifting the bullet-shaped propeller-stabilizer is disclosed wherein the pontoon rotor 60 has its shaft 63 suitably rotated and connected universally upon a yoke 64 on a shaft 65 which is revolvable thru means of the worm wheel 66 operated by a worm 67, there being a cable 68 connected to the free end of the shaft 63, which cable is trained over the overhead pulley 69, and when this cable is manually pulled it is possible to effect the angular disposition of the pontoon rotor.

Many peculiar attributes flow from the use of the foregoing types of flying machines. There are peculiarities of air currents due to the novel auger action and vortex-creating forces of the craft described. Thus the overhung wing types of craft, where hull rotates around the encased fuselage is designed to catch and to strongly concentrate the current forces from whirling motors beneath them. This causes a lifting effect of considerable extent as well as magnifying the grip of the rotors upon the confined air. These rotor wave motions may then be made to act in a unitary control by the conformation of their gyrations and by adjustment of the hover-roof vanes or decks. These sailing designs of vehicle craft make use of every bit of air current cast off by forward motors as a direct returning propulsive force, due to their circular turnip-like or wave-like conformation, with added sleeve-adjustable and universal-joint action. By nosing the rotors in proper direction against the air stream and wind, horizontally or at any angle up or down, the proper stabilization and speed may be attained economically.

Since these propeller-stabilizers as used on the peculiarly shaped, various structures described, are scientifically counterpoised they will not need to rotate nearly as rapidly as conventional aeroplane propellers. They can waft gently thru the air, throwing a circuiting blanket or buffer bank of air continually against the new regions of forwardly contacted air impact thus casting them off so as to nullify all friction on the sides. Also the upward driving portion of forces from the tornado-like fulcrum beneath the "spoon-wing" causes great lifting effect in any direction towards which the hover-wing is turned or oscillated.

The vortex-holding roofs already set forth protect the vital machinery and passengers from falling objects from above as in warfare or accidents. They also aid in a drifting landing onto land or water with motors shut off or but slowly rotating on their ball bearings thus making this type of machine an automatic parachute since the ascending currents of air actuate the long-extended expansive areas of the spiraled-rotary, off-powered or reduced motors. This causes them to work in reverse air-mesh with their usual direction of propulsion, and in counter-cylinder resistance for braking-effect within their motors.

It should be observed that the craft herein described can be operated with or without wings, in the latter case enabling a faster rate of climb to altitude than with an aeroplane. It can ascend or descend vertically and land on a field no larger than itself. By vertically positioning all the two or more units of the craft, and by rotating the propellers furiously, a better and safer landing can be made. The fast rotating spiral out-flung pontoon motors of any type of craft act both as substantial buoying agents and as propulsive mediums. The motion of the rotors will also act, with the rotor momentum as gyroscopic stabilization and cantilever balances.

From the foregoing it will be established that a cabin-planed, friction-nullifying structure is provided having oppositely arranged, balanced and stabilized propellers comprising hollow-inflated, rotary convolute screws, shiftable multi-angularly, relatively to the cabin-planed structure, the structure providing a wing spread inflated and shiftable if desired aiding the propellers in a sustaining flight. Also vehicle devices are made possible, due to the use of the pontoon screws and wings and to the power connected lower and upper craft, which can be independently controlled and operated and which can cause a transference of fuel, power or energy to be made from lower tugs to aerial vehicles or vice versa.

In my present invention it is to be observed that my wings may be pontoon-flotilla extended in a single unit formation, as well as my rotors. This extension may comprise lateral, longitudinal, oblique or other "formation." They may exhibit single or multiple compound-unit forms. They may also be of variant types, comprising friction-retarding rotary shell drums, etc. Or intermediate, segmental, fuselage-transit, universal-angling joints will connect both "habitable wing" train-units or rotor-train units, as the case may be. The universal adjustment attained thru means of my universal-conduit joints will aid in a rigid control, and in a selective rotor-propulsive steering action in a slow-curved, maneuvering manner. Due to buoyancy and size, the propellers of my types of units may revolve more slowly than in the case of other propellers, and yet produce faster speeds.

I do not mean to confine myself to the exact details of construction but claim all varieties falling within the purview of the appended claims.

The herein described rotor devices are capable of modern interior and operative train equipment, with vibrational and shock absorbing coupling features, the units being connected by a cushioning telescopic and communicable means. The insulation from shock and accident includes a complete enveloping system of either armored revolving rotors, or armored adjusting wings, since, as in Figure 1, the wing may be rotatably connected by its universal to a huge single or multiple coupled rotor arrangement. This rotor may also be habitable.

Also any operative means, as electricity, compressed fluid, or mechanically operative control, etc., is described for control of adjusting wings, rotors, and parts.

The rocket or fluid pumping conduit system may also be used with tremendous "braking" effect when the rotors are slowed up or reversed, comprising somersaulting means.

The compressed air system will give a remarkably low fuel consumption, with added economy features of friction and drag nullification, and with much greater speed and acceleration.

With aluminum or similar construction, and largest dirigible chamber capacity, extreme lightness for air-floating is obtained, with the added improved features and control of an aeroplane.

The usual heavy duty strain placed upon the standard type of propeller is removed by the use of the larger and more expansive vane areas of the screw type rotor in this turbinate propeller.

A gyroscopic and stabilized or vertical center of gravity is inherent in this invention when using the train type of multiple-coupled rotor bodies. This is especially valuable for direct vertical descent, as in the city, upon city blocks or lots and house-tops. Engine mountings are also at center.

Lowered economy is possible by any cheap power system, as that of the Diesel motor, in turn producing the compressed air or electricity described as serviceable for the multiple propeller.

Ricocheting, strong and lasting construction of spherical or oval form is one of the system's features. This gives reinforcement against the peculiarly strong outward stresses placed upon airships in the higher reaches of the air or so-called "stratosphere."

For maintenance of continuous lift or buoyant travel in such a medium of rarefied immersion as the stratosphere, certain points seen in this invention are thus necessary, such as (1) more expansive areas of inflation; (2) a helicopter or windmill type of downward-thrusting propeller; (3) greater speed with good streamlining; (4) compression use of frontal air impact force, and returning rear forces (by use of my screw motors); (5) universal joint lifting of upward-nosing propeller units with resulting downward thrust of all currents; (6) a vertical or downward rocket-aiding or acceleration of propelled currents. Compressor-carburetors and explosive types of motors, as herein described, are not necessary, though possible, with these propellers, and very useful in the rare upper stratosphere where reactive ejection or rockets are proven to be necessary for aerial travel.

Intake at front of craft of tremendous amounts of lowest chilled atmosphere (or of water in submarines) for returning ejective aiding purposes (as rockets) forms the basis of the most effective possible means of heat and temperature control, arising from engines, friction of fast travel, or other conditions of environment, etc.

Interior ventilation and air-conditioning in the upper rare atmosphere is thus automatically provided.

There is a tremendous derived free lifting-propulsion force, hitherto unused and unknown, derived from the use of these spoon-wings with associate rotors. Maximum lift is found resulting with minimum of "drag" or friction. The highest ratio of power to weight is obtained in this system.

It is pointed out that the lighter an aeroplane, amphibian or a land vehicle weighs the less it costs to operate it in fuel, upkeep, etc. Hence the value of the included extensive inflation of all available wing and body space in this invention.

An interchangeable or convertible air, land and sea vehicle is seen in all types, having improved universal-angling and instantly effective vertical rising and landing ability. Interior cabin spaces are doubly insulated from injury of accidental collision, quick temperature changes, etc.

Wing lift as herein is made independent of the usually necessary, continuous flow of fast slipstream current, because of the controlling, buoying effect of the underslung novel lifting rotors, giving also uniform, automatic brake throttling, parachute descent. At the same time the rounded, graceful cigar-shaped lines of this vehicle design give least resistance to air or water current resistance in traveling, they also allow for maximum interior cabin space. The combined units are most roomy inside, while being capable of the most quickly alert steering movements in response to the synchronized universally jointed steering system.

The outer incasing, hollow rotor turbines or propeller-rotors give the largest dirigible buoyant chamber capacity, while producing utmost power and speed. They are thus capable of modern, luxurious train or steamer appointments, equipment and operation, but with the added advantage of vibrationless travel. They constitute a notable advance in design for largest transport carriers, as well as for speedy, streamlined racers. There is controllability at all speeds.

A new system of stratospheric travel suitable to its perpetual, limitless, rare etheric or vacuum regions is thus seen and set forth for the figures of this case and my other apparatus, together with standard and conventional vehicle parts.

This vacuum accommodation and perfect fitness is, therefore, claimed for this system of invention and accrues from the use of spiral, progressively and successively extendable separate power or energized, coacting and transferring units, which are suitably telescopic in interrelation and reciprocal in conduit-and-frame extension, with transit-transfer means, while retaining those aforementioned abilities of fluid retention and air-tightness.

Further application and claims, more fully setting forth the use of the variant and complete types of energy which are possible in this system, will be taken up in a copending patent application, but sufficient means are inherent and already claimed for the successful consummation of the applicant's "Tourbillion" types of stratospheric navigation, speeding thru the more distant reaches of etheric realms, or perhaps even extending to planetary communication.

Using the known interplanetary or meteoric data of speeds and their objective rectilinear accuracy, together with the system of successfully demonstarted tremendous rocket forces calculated in wind tunnel experiments, it will be readily seen that by this patented expulsion and turbine system a fit and adequate method of slow starting and equally-agreeable and safe step-retarded stops is obtainable, making possible mathematically progressive starting and deceleration for the necessary graduation and control of super-speed in rarefied vacuum regions, such as in etheric and planetary space.

This solves the problem of more distant, faster travel, continuous, momentive progression and partial fuel elimination, making a way open also for gravity-nullifying suspension of huge vehicle-craft or permanent structures high above the earth where the 200 or 300 miles of intervening travel could be quickly traversed. Non-gravitational waystations for further upward travel thru ether regions could thus be readily fixed and their colder energies and gases piped to earth or vice versa; materials, food, fuels, etc., supplied to vehicles and aerial structures on various strata up through the earth's fluid occeanic depths.

What I desire to claim and secure by Letters Patent is:—

1. In combination a plurality of independently shiftable, communicating and interconnected fuselages, means for effecting the shifting of said fuselages severally and selectively, and a series of jet and propulsive units associated with the fuselages.

2. In combination a plurality of fuselages, buoyant rotary propulsive and stabilizing units projecting from and associated with said several fuselages, and unitary mechanism for simultaneously varying the distance apart of the several fuselages, each fuselage being independently adjustable angularly of the other fuselages.

3. A device as described consisting of opposite screw, buoyant bodies, each body being composed of two sections, one of which provides a fuselage and the other of which provides a convolute cigar-shaped propulsive device.

4. In a device as described, the combination of a longitudinal plurality of inter-connected make-and-break jointed rotary propulsive vehicles, and mechanism having provision for simultaneously or independently adjusting the angular positions of said propulsive vehicles.

5. In a device as described, the combination of a cabin structure, a peripherally-shiftable cabin-sustaining and cabin stabilizing unit associated around said cabin structure, and buoyant rotary screws connected to said cabin structure and serving to provide propulsive and rudder controls therefor.

6. In a device as described, a buoyant structure comprising one part a rotary convolute-vaned propeller and another part providing a wing spread longitudinally around the first part.

7. In a device as described, in combination a buoyant structure composed of a plurality of angularly jointed pontoon drums acting as propulsive rotors and compensating controls in the form of propulsive stabilizers connected to said structure for controlling the direction and equilibrium of said structure.

8. In combination, a plurality of screw-shaped bodies providing a serpentine propulsion device, and additional screw-shaped bodies interconnected in angularly jointed relation to said device and serving as a stabilizing agency for said devices.

9. In a device as described, the combination of an adjustable, hollow communicating framework, having provision for maintaining itself aloft when in movement, and a series of propulsive rotating bodies held in propulsive relation upon said framework.

10. In a device described a concatenary interconnected series of independently controlled and shiftable rotary propulsive units and convolute-vaned rotary stabilizing units angularly shiftable to counterbalance selectively and buoyantly any point of the longitudinal axis of the interconnected series of propulsive units.

11. In combination, a cabin-planed structure, oppositely arranged, balanced and stabilized propellers therefor, each propeller consisting of a rotary screw shiftable relatively to said cabin-planed structure, said structure providing a wing spread aiding said propellers in sustained and stabilized flight.

12. In a device as described, in combination, a series of interconnected interlinked, universally jointed self-sustained, self-propelled, stabilizing air-tight bodies angularly manageable thereabout and, rotatable, concave-vaned shield-mechanism for compounding the current impulses of said bodies.

13. In a device as described, in combination, an air-tight, intercoupled series of directionally controlled propulsive bodies, means for disposing said bodies in zigzag relation for collective stabilization, and separate communicating means arranged and so operating as to afford ingress and egress thru all of the bodies, and access to all parts thereof, whether in line or out of line.

14. In a device as described, in combination, air-boring, air-circuiting, rotor-rocket propelled vehicles, means for adjustably positioning any of said vehicles for nosing or self-righting action, and for zigzag stabilization purposes, and means providing a shiftable framework of concatenary design for interconnecting all the vehicles whereby they may be caused to contribute quicker maneuvering and propulsion, air-counterpoising, and cantilever equilibrium.

15. In combination with a non-adjustable airfoil structure, means effective to sustain the same in flight, and hollow-pontoon rotor, buoyant means supported below the said airfoil structure designed to stabilize and propel the same.

16. In a flying boat, amphibian or land vehicle, the combination of a main cabin structure, a series of superposed coextensive fluid-current control members including lifting airfoil vanes, lower wing units associated with said members, means whereby a rocket compression-fluid medium may be evacuated from the area of impact and sucked in and laterally and rearwardly expelled through a suitable rocket mechanism, and manually operative means for controlling the action of the last-named means.

17. A non-adjustable airfoil structure which is buoyantly supported and maneuvered in relation to and by the functioning of adjusable hollow buoyant rotor propulsive means supported beneath said wings for buoyant, propulsive purposes.

18. In fluid-actuating apparatus formed with a wing spread, rotary hollow spiral screw propeller means placed adjustably beneath a wing spread for fluid-reactive purposes.

19. In lighter and heavier-than-air winged-craft, a relatively-elongated, elliptical hollow spoon-shaped airfoil vane having the leading edge bull-nosed or comparatively larger than the rest, and streamlined with standard airfoil contour for increased gliding speed, and adapted to the use of underslung, vortex-creating rotors having a high degree of lifting power together with propulsion.

20. A non-adjustable airfoil structure including adjustable hollow buoyant rotor propulsive means, said airfoil structure being buoyantly supported and maneuvered in relation to and by the functioning of said adjustable hollow-buoyant rotor-propulsive means supported beneath said wings for buoyant propulsive purposes, and wherein said wing is habitable.

21. In a device as described, the combination of a cabin structure, adjustably universal propulsive means associated therewith externally of said cabin structure and flight sustaining inflated shield planes having curved chambers beneath which said propulsive means function.

22. An airfoil structure including adjustable hollow buoyant rotor propulsive means, said airfoil structure being buoyantly supported and maneuvered in relation to and by the functioning of said adjustable rotor propulsive means supported beneath said wings for buoyant, propulsive purposes, said wing-covered rotor means being habitable.

HAROLD J. STONE.